United States Patent
Chen et al.

(10) Patent No.: US 10,166,616 B2
(45) Date of Patent: Jan. 1, 2019

(54) BAND SAW MACHINE WITH STARTING CUTTING POSITION CONTROL AND CONTROL METHOD THEREOF

(71) Applicants: TERA AUTOTECH CORPORATION, Taichung (TW); Department of Electrical Engineering, National Changhua University of Education, Changhua County (TW)

(72) Inventors: Peng-Lai Chen, Taichung (TW); Yi-Lung Lee, Taichung (TW); Po-Hsuan Chen, Changhua County (TW); Tsair-Rong Chen, Changhua County (TW); Yu-Lin Juan, Changhua County (TW)

(73) Assignees: TERA AUTOTECH CORPORATION, Taichung (TW); DEPARTMENT OF ELECTRICAL ENGINEERING, NATIONAL CHANGHUA UNIVERSITY OF EDUCATION, Changhua, Changhua County (TW)

( * ) Notice: Subject to any disclaimer, the term of this patent is extended or adjusted under 35 U.S.C. 154(b) by 0 days.

(21) Appl. No.: 15/678,916

(22) Filed: Aug. 16, 2017

(65) Prior Publication Data

US 2017/0341168 A1   Nov. 30, 2017

Related U.S. Application Data

(62) Division of application No. 15/068,196, filed on Mar. 11, 2016, now Pat. No. 9,962,780.

(30) Foreign Application Priority Data

Jan. 29, 2016 (TW) .............................. 105102823 A

(51) Int. Cl.
  *B23D 55/08* (2006.01)
  *G05B 19/402* (2006.01)
  (Continued)

(52) U.S. Cl.
  CPC .......... *B23D 59/002* (2013.01); *B23D 55/06* (2013.01); *G05B 19/402* (2013.01); *G05B 2219/45044* (2013.01); *G05B 2219/50047* (2013.01)

(58) Field of Classification Search
  CPC .. B23D 59/001; B23D 59/002; B23D 59/008; G05B 19/402; G05B 19/404; G05B 2219/50047
  See application file for complete search history.

(56) References Cited

U.S. PATENT DOCUMENTS 3,754,490 A * 8/1973 Sata ................... B23D 53/00
                                                   83/168
5,115,403 A   5/1992 Yoneda et al.
(Continued)

FOREIGN PATENT DOCUMENTS

CN    101342608 B    9/2010
JP    2008260085     10/2008
(Continued)

OTHER PUBLICATIONS

Office Action issued in corresponding TW patent application No. 105102823 with English language translation (6 pages).
(Continued)

*Primary Examiner* — Stephen Choi
(74) *Attorney, Agent, or Firm* — Muncy, Geissler, Olds & Lowe, P.C.

(57) ABSTRACT

A band saw machine includes a working platform, a cutting machine, a vertical displacement element causing the cutting machine to move vertically, a height sensor and a central
(Continued)

processor. The working platform includes a reference plane for placing a workpiece. The cutting machine includes a driving wheel, a driven wheel, a band saw wound on the driving wheel and the driven wheel, and a motor that electrically drives the driving wheel. The band saw includes a starting cutting tooth and a processing cutting tooth sequentially arranged. The height sensor detects a starting cutting point of the workpiece farthest from the reference plane. The central processor receives information of a position of the starting cutting point, and controls a displacement speed of the vertical displacement element and a first rotational speed of the motor to cause the starting cutting tooth to first cut at the starting cutting point.

4 Claims, 4 Drawing Sheets

(51) Int. Cl.
*B23D 59/00* (2006.01)
*B23D 55/06* (2006.01)

(56) References Cited

U.S. PATENT DOCUMENTS

| | | | | |
|---|---|---|---|---|
| 5,208,760 | A * | 5/1993 | Moriya | B23D 55/086 700/192 |
| 7,654,180 | B2 * | 2/2010 | Hellbergh | B23D 55/00 83/13 |
| 2009/0178527 | A1 * | 7/2009 | Tokiwa | B23D 55/005 83/74 |
| 2015/0020660 | A1 | 1/2015 | Jeng et al. | |
| 2015/0277431 | A1 * | 10/2015 | Taylor | G05B 19/4163 700/185 |

FOREIGN PATENT DOCUMENTS

| | | |
|---|---|---|
| TW | 330871 | 5/1998 |
| TW | 200427536 A | 12/2004 |

OTHER PUBLICATIONS

Search Report issued in corresponding TW patent application No. 105102823 with English language translation (2 pages).

\* cited by examiner

BAND SAW MACHINE WITH STARTING CUTTING POSITION CONTROL AND CONTROL METHOD THEREOF

CROSS REFERENCE TO RELATED APPLICATIONS

This application is a Divisional of co-pending application Ser. No. 15/068,196 filed on Mar. 11, 2016, for which priority is claimed under 35 U.S.C. § 120; and this application claims priority of Application No. 105102823 filed in Taiwan, R.O.C. on Jan. 29, 2016 under 35 U.S.C. § 119; the entire contents of all of which are hereby incorporated by reference.

FIELD OF THE INVENTION

The present invention relates to a band saw machine, and particularly to a band saw machine with starting cutting position control and a control method thereof.

BACKGROUND OF THE INVENTION

When cutting a material, a common saw blade is usually applied to cut the material to achieve such object. However, cutting a hard or large material using the saw blade is both time and labor consuming. A band saw machine is thus invented. A band saw machine adopts a band saw in form of an endless ring as a cutting tool and is wound onto two saw wheels. As the band saw is driven and hence rapidly rotated by rotating the saw wheels, the above band saw machine is capable of quickly cutting a material.

For example, the U.S. Patent Publication No. 20150020660, "Band Saw Machine Capable of Automatically Regulating Cutting Speed", includes a chassis, a motor, a driving wheel, a driven wheel, a band saw, at least one band saw regulator, at least one force sensor and a control system. The motor is mounted to the chassis, and includes a driving shaft. The driving wheel is mounted to the chassis and connected with the driving shaft, such that the driving wheel is driven by the motor to rotate. The driven wheel is rotatably mounted to the chassis and faces the driving wheel. The band saw is wound on the driving and driven wheels. The at least one band saw regulator is mounted to the chassis and is located between the driving and driven wheels, and is for pressing the band saw. The at least one force sensor is mounted inside the band saw regulator and is for sensing the amount of force applied to the band saw regulator in the process of cutting to further transmit a sensing signal to a control system. The control system controls a power output that the motor outputs to the driving wheel according to the sensing signal.

Further, the band saw usually includes a plurality of sequentially disposed sawteeth having different sharpness levels and breadths. The purpose of sharp sawteeth having a better sharpness level is to provide a cutting depth, hence allowing the band saw to sink deeply into a workpiece to be sawn. The purpose of broad sawteeth having a larger breadth is to provide cutting width and breadth. When cutting a material, if the part that first comes into contact with the material is not the sharp sawteeth, larger resistance, noise and vibration are generated. In more severe cases, chipping of the band saw may even be incurred to affect the lifecycle of the band saw.

Although a conventional band saw machine is capable of regulating the cutting speed, it is incapable of controlling whether the part that comes into contact with the material first is sharp sawteeth or broad sawteeth. Therefore, there is a need for a solution that solves the above issues.

SUMMARY OF THE INVENTION

The primary object of the present invention is to solve the issue of affected lifecycle as a result of chipping of the band saw due to large resistance, noise and vibration caused by an initial contact between a band saw and a workpiece to be sawn.

To achieve the above object, the present invention provides a band saw machine having starting cutting position control for cutting a workpiece. The band saw machine includes a working platform, a cutting machine, a vertical displacement element, a height sensor and a central processor. The working platform includes a reference plane for placing the workpiece, and a fixing member disposed on the reference plane and for fixing the workpiece. The cutting machine includes a driving wheel, a driven wheel, a band saw wound on the driving wheel and the driven wheel, and a motor that electrically drives the driving wheel. The band saw includes a starting cutting tooth and a processing cutting tooth that are sequentially arranged. The vertical displacement element is connected to the working platform and the cutting machine, and causes the cutting machine to move vertically. The height sensor is disposed at the cutting machine, and detects a starting cutting point farthest from the reference plane. The central processor is electrically connected to the height sensor, the vertical displacement element and the motor, and receives information of a position of the starting cutting point to accordingly control a displacement speed of the vertical displacement element and a first rotational speed of the motor to cause the starting cutting tooth to first cut at the starting cutting point.

To achieve the above object, the present invention further provides a method for controlling a starting cutting point. The method includes following steps.

In step S1, a workpiece is placed on a reference plane of a working platform, and the workpiece is fixed by a fixing member.

In step S2, a starting cutting point of the workpiece farthest from the reference plane is detected by a height sensor.

In step S3, a driving wheel is electrically driven by a motor, and a first rotational speed of the motor is controlled by a central processor. The driving wheel drives a band saw wound on the driving wheel and a driven wheel, and the band saw further drives the driven wheel. The band saw includes a starting cutting tooth and a processing cutting tooth.

In step S4, a distance between the band saw and the starting cutting point is adjusted by a vertical displacement element, and a displacement speed of the vertical displacement element is controlled by the central processor to cause the starting cutting tooth to first cut at the starting cutting point.

In conclusion, in the preset invention, the first rotational speed of the motor and the displacement speed of the vertical displacement element are controlled by the central processor. Thus, the starting cutting tooth is allowed to first cut at the starting cutting point, hence reducing resistance generated by the band saw and preventing chipping of the band saw to further increase the lifecycle.

DETAILED DESCRIPTION OF THE PREFERRED EMBODIMENTS

Details and technical contents of the present invention are given with the accompanying drawings below.

Figure 1:
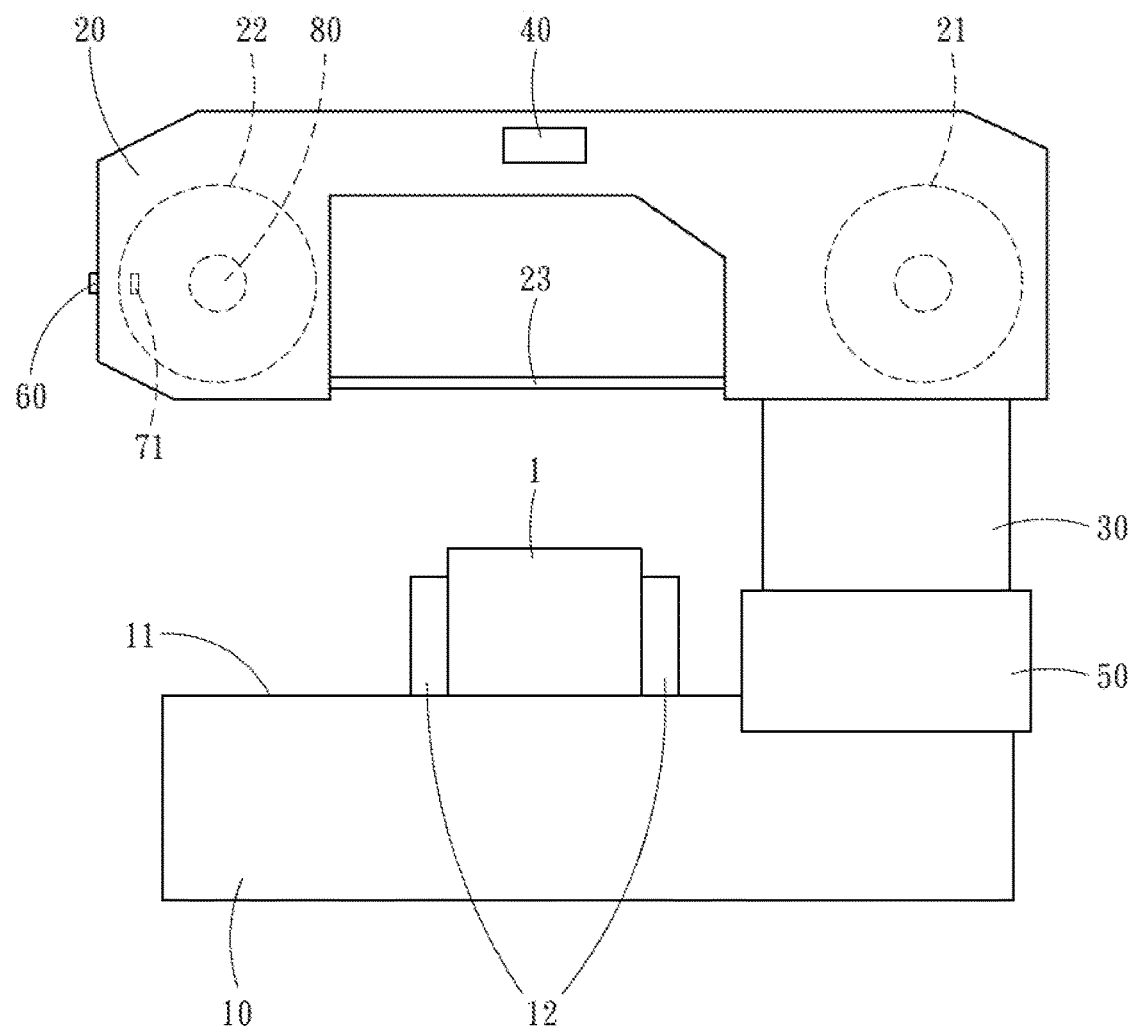
FIG. 1 is a front view according to a preferred embodiment of the present invention.
Figure 2:
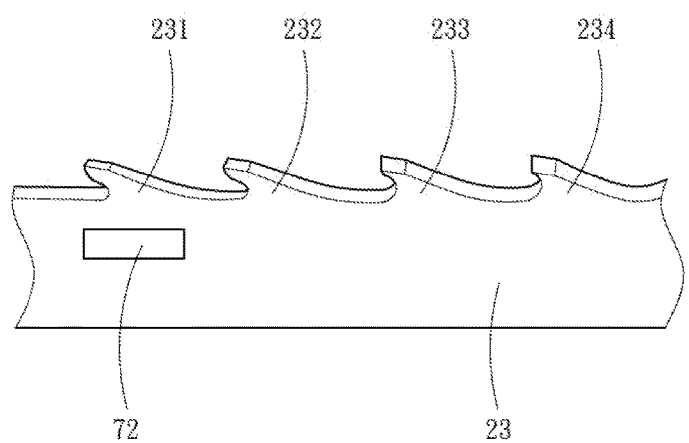
FIG. 2 is a partial perspective view of a band saw of the present invention.
Figure 3:
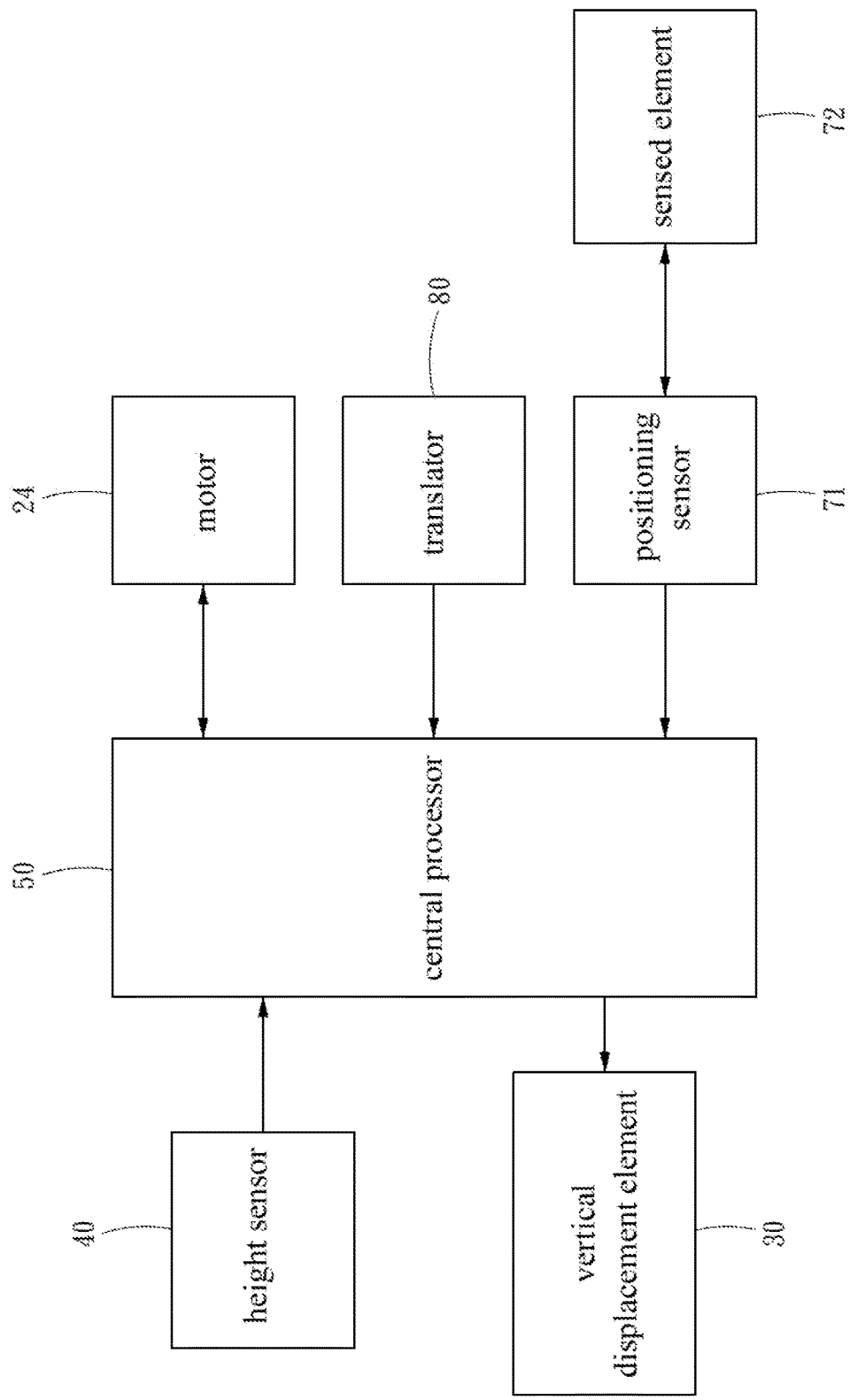
FIG. 3 is a function block diagram according to a preferred embodiment of the present invention.

Referring to FIG. 1 to FIG. 3, the present invention provides a band saw machine with starting cutting position control for cutting a workpiece 1. The band saw machine of the present invention includes a working platform 10, a cutting machine 20, a vertical displacement element 30, a height sensor 40 and a central processor 50. The working platform 10 includes a reference plane 11 for placing the workpiece 1, and a fixing member 12 disposed on the reference plane 11 and for fixing the workpiece 1. The cutting machine 20 includes a driving wheel 21, a driven wheel 22, a band saw 23 and a motor 24. The band saw 23 includes a starting cutting tooth 231 and a processing cutting tooth 233 that are sequentially arranged, and is wound on the driving wheel 21 and the driven wheel 22. The starting cutting tooth 231 serves for providing a cutting depth, and the processing cutting tooth 233 serves for providing cutting width and breadth. The motor 24 drives the driving wheel 21 to rotate, and drives the band saw 23 wound on the driving wheel 21. The band saw 23 further drives the driven wheel 22 to rotate.

The vertical displacement element 30 is connected to the working platform 10 and the cutting machine 20, and controls the vertical displacement of the cutting machine 20 to cause the cutting machine 20 to move close to or away from the working platform 10. The height sensor 40 is disposed at the cutting machine 20, and detects a position of a starting cutting point of the workpiece 1 farthest from the reference plane 11. As the workpiece 1 may not be entirely planar, an optimal condition is cutting from a highest point. If a position to be cut for the workpiece 1 is planar, the highest point may also be identified through slightly tilting the workpiece 1. Alternatively, if the band saw 23 is disposed to be slightly tilted relative to the reference plane 11, the planar workpiece 1 may be cut in a slanting manner. The central processor 50 is electrically connected to the height sensor 40, the vertical displacement element 30 and the motor 24. The height sensor 40 transmits information of the position of the starting cutting point to the central processor 50. According to the position of the starting cutting point, the central processor 50 further controls a displacement speed of the vertical displacement element 30 and a first rotational speed of the motor 24, such that the starting cutting tooth 231 may first cut at the starting cutting point. Thus, the starting cutting tooth 231 and the processing cutting tooth 233 are allowed to progressively cut deeply and then cut broadly to reduce the cutting resistance, thereby preventing chipping of the band saw 23 and further increasing the lifecycle.

In the embodiment, referring to FIG. 2, the band saw 23 further includes a depth cutting tooth 232 disposed between the starting cutting tooth 231 and the processing cutting tooth 233, and a trimming cutting tooth 234 disposed at one side of the processing cutting tooth 233 away from the depth cutting tooth 232. The depth cutting tooth 232 serves a same function as the starting cutting tooth 231, and the trimming cutting tooth 234 serves a same function as the processing cutting tooth 233. Further, widths of cutting surfaces of the starting cutting tooth 231, the depth cutting tooth 232, the processing cutting tooth 233 and the trimming cutting tooth 234 gradually increase from narrow to wide to satisfy the purposes of cutting from deeply to cutting broadly. The above cutting teeth in the number of four is an example for illustrations, and is not limited to such exemplary value in actual practice, given that the effect of cutting deeply and cutting broadly is achieved. In addition, the band saw 23 may include tens of sawteeth, which includes a plurality of groups each consisting the starting cutting tooth 231, the depth cutting tooth 232, the processing cutting tooth 233 and the trimming cutting tooth 234.

The band saw machine of the present invention further includes a tightening puller 60 disposed on the driven wheel 22. The tightening puller 60 is capable of adjusting a relative distance between the driven wheel 22 and the driving wheel 21, such that the band saw 23 may be steadily wound on the driven wheel 22 and the driving wheel 21 without disengaging during operations to increase operation safety.

To accurately learn the position of the starting cutting tooth 231, this embodiment further includes a positioning sensor 71 disposed at the driven wheel 22 and electrically connected to the central processor 50, and a sensed element 72 disposed at the band saw 23 and corresponding to the starting cutting tooth 231. When the band saw 23 is driven and rotated, the sensed element 72 passes by the positioning sensor 71. When the position of the sensed element 72 is detected by the positioning sensor 71, the positioning sensor 71 confirms the position of the starting cutting tooth 231 and transmits information of the position to the central processor 50. Accordingly, the central processor 50 adjusts the displacement speed of the vertical displacement element 30 and the first rotational speed of the motor 24, thereby enhancing the accuracy of the starting cutting tooth 231 first cutting at the starting cutting point.

The band saw machine of the present invention further includes a translator 80. The translator 80 is disposed at the driven wheel 22, and records a second rotational speed of the driven wheel 22. Since the driven wheel 22 is driven by the driving wheel 21, during the process of power transmission, because of issues of momentary disengagement or mismatch between the driving wheel 21 and the driven wheel 22 or even friction factors, the second rotational speed may be slightly slower than the first rotational speed. However, as the second rotational speed is in fact a correct speed, in order to have the second rotational speed satisfy an expected speed, the central processor 50 receives and compares the first rotational speed and the second rotational speed to accordingly adjust the first rotational speed of the motor 24, so that the second rotational speed may satisfy the expected speed.

Figure 4:
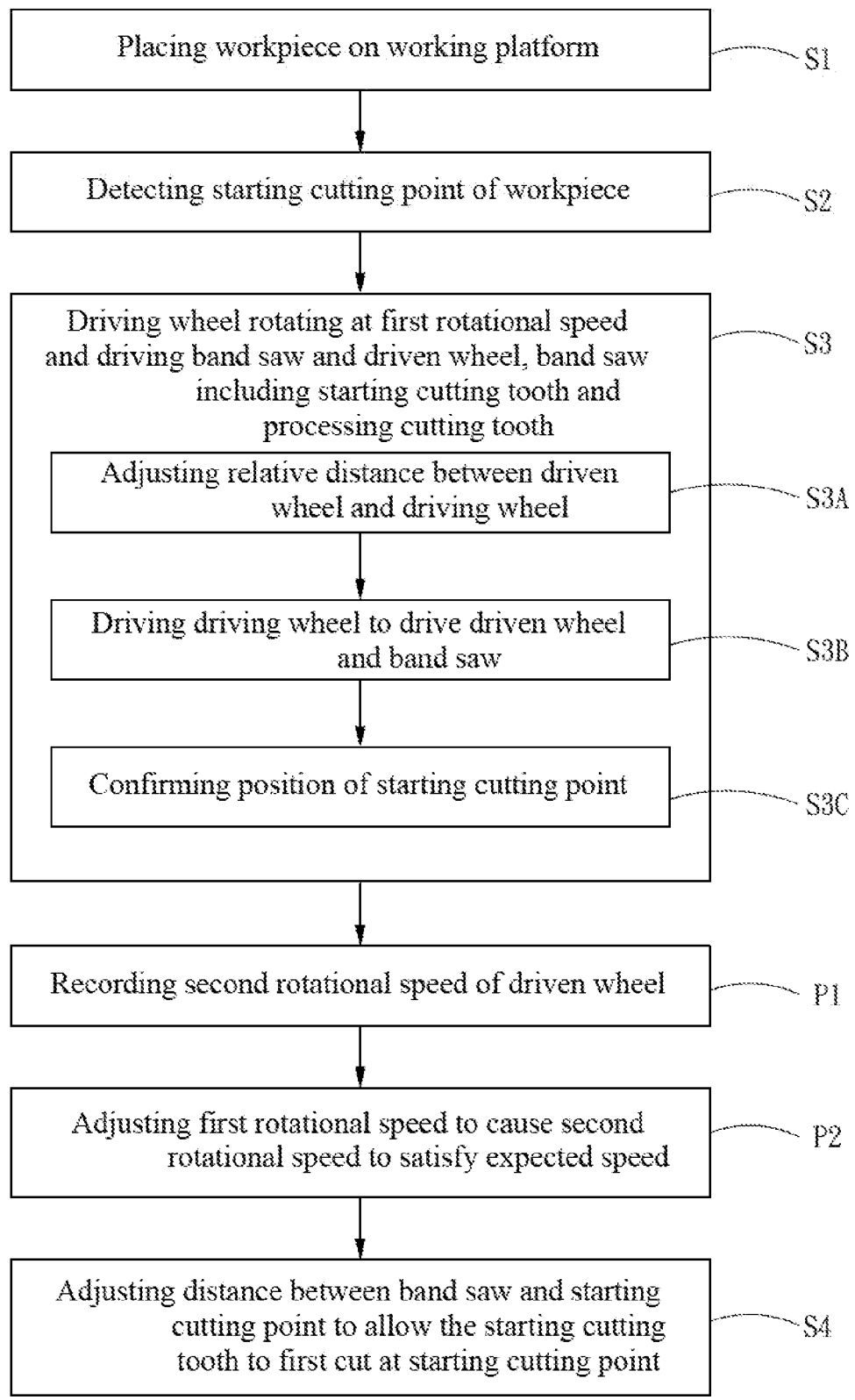
FIG. 4 is a flowchart according to a preferred embodiment of the present invention.

Referring to FIG. 4, a method for controlling a starting cutting position of the present invention includes following steps.

In step S1, a workpiece 1 is placed on a reference plane 11 of the working platform 10, and the workpiece 1 is fixed by the fixing member 12 to prevent the workpiece 1 from causing cutting errors due to movements during a cutting process.

In step S2, a starting cutting point of the workpiece 1 farthest from the reference plane 11 is detected by a height sensor 40 disposed on a cutting machine 20.

In step S3, a driving wheel 21 is electrically driven by a motor 24, and a first rotational speed of the motor 24 is controlled by a central processor 50. The driving wheel 21 is rotated to drive a band saw 23 wound on the driving wheel 21 and a driven wheel 22, such that the band saw 23 further drives the driven wheel 22. The band saw 23 includes a starting cutting tooth 231 and a processing cutting tooth 233. Step S3 further includes steps S3A to S3C below.

In step S3A, a relative distance between the driven wheel 22 and the driving wheel 21 is adjusted by a tightening puller 60 disposed on the driven wheel 22. Thus, without disengaging from the driven wheel 22 and the driving wheel 21, the band saw 23 is allowed to be steadily wound on the driven wheel 22 and the driving wheel 21.

In step S3B, the driving wheel 21 is electrically driven by the motor 24 to drive the driven wheel 22 and the band saw 23, and the first rotational speed of the motor 24 is controlled by the central processor 50.

In step S3C, a sensed element 72 disposed at the band saw 23 and corresponding to the starting cutting tooth 231 is detected by a positioning sensor 71 disposed at the driven wheel 22. When the band saw 23 is rotated and the sensed element 72 passes by the positioning sensor 71, the position of the starting cutting tooth 231 may be confirmed.

After step S3, the method of the present invention further includes following steps.

In step P1, a second rotational speed of the driven wheel 22 is recorded by a translator 80 disposed on the driven wheel 22.

In step P2, since the driven wheel 22 is driven by the driving wheel 21, during the process of power transmission, because of issues of momentary disengagement or mismatch between the driving wheel 21 and the driven wheel 22 or even friction factors, the second rotational speed may be slightly slower than the first rotational speed. The central processor 50 receives and compares the first rotational speed and the second rotational speed to further adjust the first rotational speed, so that the second rotational speed may satisfy the expected speed.

In Step S4, a distance between the band saw 23 and the starting cutting point is adjusted by a vertical displacement element 30, and a displacement speed of the vertical displacement element 30 is controlled by the central processor 50. Further, by coordinating with the first rotational speed of the motor 24, the starting cutting tooth 231 is allowed to first cut at the starting cutting point.

In conclusion, the present invention offers following features.

1. By allowing the starting cutting tooth to first cut at the starting cutting point, effects of progressively cutting deeply and then cutting broadly can be achieved, hence reducing resistance generated by the band saw and preventing chipping of the band saw to further increase the lifecycle.

2. The tightening puller allows the band saw to be steadily wound on the driven wheel and driving wheel without disengaging during operations to increase operation safety.

3. Through the positioning sensor and the sensed element disposed, the position of the starting cutting tooth can be precisely learned to further enhance the accuracy of the starting cutting tooth first cutting at the starting cutting point.

4. With the translator disposed on the driven wheel, a correct speed of actual rotations of the driven wheel can be measured. Further, the first rotational speed is adjusted by the central processor to cause the second rotational speed to satisfy an expected speed, thereby preventing the accuracy of the starting cutting tooth first cutting at the starting cutting point from being affected by the mismatch of the second rotational speed.

What is claimed is:

1. A band saw machine with starting cutting position control, for cutting a workpiece, the band saw machine comprising:
 a working platform, comprising a reference plane for placing the workpiece, and a fixing member disposed on the reference plane and for fixing the workpiece;
 a cutting machine, comprising a driving wheel, a driven wheel, a band saw wound on the driving wheel and the driven wheel, and a motor that electrically drives the driving wheel, the band saw comprising a starting cutting tooth and a processing cutting tooth that are sequentially arranged, wherein a positioning sensor disposed at the driven wheel, and a sensed element disposed at the band saw and adjacent to the starting cutting tooth, the position of the sensed element is detected by the positioning sensor to confirm the position of the starting cutting tooth;
 a vertical displacement member, connected to the working platform and the cutting machine, causing the cutting machine to move vertically;
 a height sensor, disposed at the cutting machine, for detecting a starting cutting point of the workpiece farthest from the reference plane; and
 a central processor, electrically connected to the height sensor, the vertical displacement element and the motor, the central processor receiving information of a position of the starting cutting point and controlling a displacement speed of the vertical displacement element and a first rotational speed of the motor to allow the starting cutting tooth to first cut at the starting cutting point.

2. The band saw machine with starting cutting position control of claim 1, wherein the band saw further comprises a depth cutting tooth disposed between the starting cutting tooth and the processing cutting tooth, and a trimming cutting tooth disposed at one side of the processing cutting tooth away from the starting cutting tooth.

3. The band saw machine with starting cutting position control of claim 1, further comprising a tightening puller disposed on the driven wheel and for adjusting a relative distance between the driven wheel and the driving wheel.

4. The band saw machine with starting cutting position control of claim 1, further comprising a translator disposed at the driven wheel and recording a second rotational speed of the driven wheel; wherein, the central processor receives and compares the first rotational speed and the second rotational speed, and accordingly adjusts the first rotational speed to cause the second rotational speed to satisfy an expected speed.

* * * * *